US011263536B2

(12) United States Patent
Malmi et al.

(10) Patent No.: US 11,263,536 B2
(45) Date of Patent: Mar. 1, 2022

(54) ARRANGEMENT AND METHOD FOR INFERRING DEMOGRAPHICS FROM APPLICATION USAGE STATISTICS (71) Applicant: Verto Analytics Oy, Espoo (FI)

(72) Inventors: Eric Malmi, Espoo (FI); Timo Smura, Espoo (FI); Hannu Verkasalo, Espoo (FI); Matti Aksela, Espoo (FI)

(*) Notice: Subject to any disclaimer, the term of this patent is extended or adjusted under 35 U.S.C. 154(b) by 532 days.

(21) Appl. No.: 15/395,383

(22) Filed: Dec. 30, 2016

(65) Prior Publication Data
US 2018/0189660 A1 Jul. 5, 2018

(51) Int. Cl.
*G06N 5/04* (2006.01)
*H04N 21/258* (2011.01)
*G06N 20/00* (2019.01)
*G06N 7/00* (2006.01)
*H04N 21/81* (2011.01)
*G06Q 30/02* (2012.01)

(52) U.S. Cl.
CPC ............... *G06N 5/04* (2013.01); *G06N 7/00* (2013.01); *G06N 20/00* (2019.01); *H04N 21/25883* (2013.01); *G06Q 30/02* (2013.01); *H04N 21/812* (2013.01)

(58) Field of Classification Search
CPC ............ G06N 5/04; G06N 20/00; G06N 7/00; H04N 21/25883; H04N 21/812; G06Q 30/02
USPC .......................................................... 706/46
See application file for complete search history.

(56) References Cited

U.S. PATENT DOCUMENTS

| 8,510,658 B2* | 8/2013 | Priyadarshan ......... G06Q 30/02 705/14.1 |
| 2007/0078702 A1* | 4/2007 | Tandon ............ G06Q 10/06375 705/7.37 |
| 2015/0356581 A1 | 12/2015 | Litmanovich et al. | |
| 2018/0012264 A1* | 1/2018 | Yates ................. G06Q 30/0247 |

OTHER PUBLICATIONS

Huang et al, eRFSVM: a hybrid classifier to predict enhancers-integrating random forests with support vector machines, Jun. 30, 1016, Hereditas, hereditas 153 article No. 6 (Year: 2016).*

(Continued)

*Primary Examiner* — Lut Wong
(74) *Attorney, Agent, or Firm* — Thomas | Horstemeyer, LLP (57) ABSTRACT Electronic arrangement comprising a data interface for transferring data with external elements, at least one processor for processing instructions and other data, and memory for storing the instructions and other data, said at least one processor being configured, in accordance with the stored instructions, to obtain at least one predictive user model including one or more demographic characteristics as dependent variables to be predicted and usage statistics of applications as explanatory variables, obtain deterministic usage statistics indicative of digital applications a target user has utilized during a monitoring period, and determine, through utilization of the deterministic usage statistics obtained during the monitoring period as input to the at least one established predictive model, an estimate of said one or more of the demographic characteristics of the target user.

17 Claims, 4 Drawing Sheets (56) References Cited

OTHER PUBLICATIONS

Gemulla et al, Data Mining and Matrices 03—Singular Value Decomposition, Apr. 25, 2013 (Year: 2013).*
Guo ("Joint Estimation of Age, Gender and Ethnicity: CCA vs. PLS"). (Year: 2010).*
Malmi et al ("You Are What Apps You Use: Demographic Prediction Based on User's Apps") (Year: 2016).*
International Search Report issued in PCT application No. PCT/FI2017/050960 dated Apr. 27, 2018.

* cited by examiner

ARRANGEMENT AND METHOD FOR INFERRING DEMOGRAPHICS FROM APPLICATION USAGE STATISTICS

The present invention relates generally to digital devices, communications, related applications and services. Particularly, however not exclusively, the invention pertains to prediction and utilization of user behavior or other characteristics, preferably demographics, based on application related user data.

BACKGROUND

Already nowadays a great majority of internet traffic arises from mobile (terminal) devices such as so-called smartphones, tablets, phablets, wearable computers and laptops. Further, most of the traffic may be attributed to applications, hereinafter 'apps'. Some even consider apps as the new Web (world wide web, WWW).

Particularly in a mobile context, the consumers already have a choice from a library of over a million applications, or 'apps', available in the app stores, and they can opt to use not only native apps but also e.g. HTML5 (Hypertext Markup Language 5) apps, widgets, web sites, or something in between. However, most service or marketing solutions covering "online users" still concentrate on e.g. website visits at the expense of terminal apps such as mobile apps.

On the other hand, understanding the demographics of users is often deemed somewhat crucial information, for example, for app developers, who wish to target their advertisements more effectively or otherwise optimize the use experience in view of e.g. user preferences arising from the demographics.

Various demographic characteristics, or 'attributes', such as gender, age, race, income level or marital status, may thus find use in marketing or generally service or application development, for instance, to serve users with personally selected, proper content. The overall userbase of apps may be segmented in a variety of ways. An app developer might be particularly interested in understanding which user segments are (under)represented when designing new ad campaigns for the app. Yet, e.g. computational social scientists may want to desperately understand how representative the users of some app are as a sample of the whole underlying population.

User behavior having regard to e.g. terminal-installed software including different apps could be metered either through downloadable software meters, or through embedded tags (on (web) sites or applications) or SDKs (software development kit, apps) that collect data on a particular app, for instance. Alternatively or additionally, such data could be acquired through traditional user survey type studies or interviews, which may unfortunately suffer from respondent subjectivity and inaccuracy particularly in the context of app usage where the overall number of available apps is generally huge and the users do not necessarily always fully recall their app related habits upon filling a traditional survey.

Further, the nature of user behavior is changing quickly due to parallel use of multiple competent devices ranging from smartphones to tablets and from laptops to smart TVs, for example.

Multiple electronic terminal devices of a user could be thus provided with highly automated, transparent measurement, or aforesaid "metering", software, which is running in the background automatically meaning no explicit user input or control is necessary. Obtaining data therefrom is not a fundamental problem in a general sense.

As alluded to hereinbefore, different user characteristics including demographic characteristics are indeed useful in providing optimized user experience in the light of e.g. tailored content such as digital advertising to terminal and app users. The demographic characteristics may be exploited in user or particularly consumer segmentation among other uses. However, the desired demographic data may not be always readily available.

SUMMARY

It is therefore one objective of the present invention to at least alleviate one or more drawbacks or challenges related to the prior art solutions involving or benefiting from the utilization of demographic data.

The objective is achieved by the various embodiments of an arrangement and method in accordance with the present invention.

In one aspect, there is provided a method for predicting user demographics, and therewith e.g. user preferences, interests, purchase intent and/or other behavior or characteristics in view of providing personalized digital content, to be performed by at least one electronic apparatus, optionally a number of functionally connected servers potentially at least some which being operable in a cloud computing environment. The method comprises obtaining preferably deterministic user data having regard to a plurality of users and a modeling period, wherein user data associated with each user of said plurality of users indicates a number of demographic characteristics of the user as well as preferably comprehensive usage statistics indicative of digital applications the particular user has utilized, preferably in or through at least one, optionally personal, user terminal, during the modeling period, establishing, through utilization of a selected modeling scheme, at least one predictive user model including one or more of the demographic characteristics as dependent variables to be predicted and the usage statistics of applications as explanatory variables (features), obtaining measured, deterministic usage statistics indicative of applications a target user has utilized during a monitoring period, and providing, through utilization of the deterministic usage statistics covering the monitoring period as input to the at least one established predictive model, an estimate of said one or more of the demographic characteristics of the target user.

The modeling period and monitoring period may optionally be of substantially equal duration, e.g. a week, a month, a quarter or a full year. Alternatively, the periods may be of mutually different lengths. For example, the modeling period may be longer.

As at least some of the demographic characteristics of the target user may be unknown, they may be thus predicted by the utilization of the above method and related model(s) created based on deterministic data covering demographic characteristics and app usage statistics of a plurality of other users.

In many practical user scenarios, instead of a single target user, a plurality of target users may be independently analyzed by an arrangement, such as a server or a system of many functionally connected servers and/or other devices, executing the method as to their app usage during the monitoring period to estimate the demographic characteristics of each user in said plurality, as being readily understood by a person skilled in the art.

Optionally, in addition to app usage statistics, which can be deemed one form of behavioral user data, some further behavioral user data may be at least initially available for modeling purposes, being thus preferably deterministic at that stage. This behavioral user data may be indicative of purchase intent or actual (product) purchase behavior, and/or some other indication of user behavior such as consumer/buyer behavior depending on the context. Such further behavioral user data may include or be derived from digital content consumption data within an app, for example. This type of further behavioral data may be thus optionally obtained from the same source, such as metering logic running in a user terminal, and/or from different source(s) as the usage statistics of apps.

The further behavioral data, or in practice a number of further behavioral data elements, may be then included in at least one established predictive model as dependent variable(s) to be predicted along with or instead of demographic characteristics.

Additionally or alternatively, at least one predictive model could apply at least some of such further behavioral data as explanatory variables, or 'features'.

Even a hybrid model is possible with some further behavioral data as explanatory and some other as dependent variables.

In some embodiments, the further behavioral data or specifically, e.g. a user intent such as purchase intent regarding a product may thus be associated, e.g. through application of a model or other type of linkage based on deterministic data, with the demographic data and/or app usage statistics.

For instance, based on the estimate of demographic characteristics of the target user, which is responsive to the metered (deterministic) app usage statistics as described herein, behavioral and/or interest data associated with such demographic characteristics may be then identified for use as an estimate or for establishing an estimate of the behavior/purchase intent regarding the particular target user.

Accordingly, the method may comprise determining an estimate of user behavior and/or user intent, e.g. purchase intent regarding some product(s). Likewise, the method may comprise determining an estimate of user preferences/interests in a wider sense in terms of products and/or digital content. The determination procedure(s) preferably utilize the estimated demographic characteristics(s) and/or underlying deterministic statistics regarding the app usage of the user.

Further, the method may comprise transferring data relative to (from and/or to) elements or systems such as at least one DMP (data management platform), supply side platform (SSP), and/or a DSP (demand-side platform). These elements may be utilized in connection with ad targeting, for example, wherein an embodiment of a method or of an arrangement executing the method according to the present invention may turn out very advantageous due to its modeling, prediction, analysis, data aggregation and data mining capabilities among other benefits as becoming evident to a person skilled in the art based on the teachings provided herein.

For instance, user data such as the usage statistics or information derived therefrom, such as the estimate of demographic characteristics, possibly originating from an SSP may be provided to the DMP and/or DSP. Yet, in some embodiments the method may comprise operating or utilizing the SSP, DMP, and/or DSP.

Accordingly, a number of users whose profiles fulfill desired criteria such as demographic criteria in terms of e.g. marketing campaign objective (target audience), may be determined from among all users represented by available user data.

In connection with the SSP, DMP and/or DSP or separately therefrom, and based on the available user data on the usage of applications, which may be obtained e.g. from the user terminals via preferably automated passive metering logic running thereat, users may be optionally autonomously modeled and/or profiled by an embodiment of the present invention for various purposes such as segmentation and audience determination in connection with e.g. marketing (ad) campaigns or some other form of targeted content provision.

Still, in some embodiments the method may further comprise utilization of selected instance(s) of lookalike, or 'look-alike', modeling, optionally in connection with the aforesaid DMP and/or DSP platforms. Based on an initial definition of desired audience characteristics such as demographic and/or behavioral attributes (these may represent e.g. current customers/audience of a party desiring to launch a marketing campaign), optionally provided by a third party system such as a DSP or some other system utilized by a marketer/party exploiting the modeling results provided by the present method, more comprehensive audience may be determined through means of lookalike modeling where commonalities are searched from the data associated with the initial group and remaining users to controllably expand the target audience from the initial group to cover further prospects originally belonging to the group of remaining users only (i.e. not current customers in the context of the above example).

In preferred embodiments, at least one of the utilized predictive models incorporates a logistic regression model.

In some embodiments, the used predictive model(s) comprise or consist of a plurality of explanatory variables, each of which representing usage statistics of a dedicated application. The initially available usage data indicative of the use of each application during the monitoring period e.g. in a binary format (used/not used) may be thus utilized as the explanatory variables (features) optionally as is. Such variables are considered application-level variables then.

Alternatively, a selected dimensionality reduction algorithm such as categorization or feature selection based solution could be first applied to the usage data to reduce the number of explanatory variables in the model, which lowers data dimensionality and thus in principle facilitates efficient electronic processing thereof by reducing associated load. For example, TSVD-based solution (Truncated Singular Value Decomposition) could be applied for the purpose.

In one other aspect, an electronic arrangement, preferably comprising a number of at least functionally connected servers, for predicting user demographics, is configured to obtain preferably deterministic user data having regard to a plurality of users and a modeling period, wherein user data associated with each user of said plurality of users indicates a number of demographic characteristics of the user as well as usage statistics indicative of applications the particular user has utilized during the modeling period, utilize a selected modeling scheme to establish at least one predictive user model including one or more of the demographic characteristics as dependent variables to be predicted and the usage statistics of applications as explanatory variables, obtain deterministic usage statistics indicative of applications a target user has utilized during a monitoring period, and determine, through utilization of the deterministic usage statistics obtained as input to the at least one established predictive model, an estimate of said one or more of the demographic characteristics of the target user.

As with the method, further behavioral user data may be obtained and included e.g. in the model(s) as dependent and/or explanatory variable(s).

Also various other considerations presented herein concerning the embodiments of the method may be flexibly applied to the embodiments of the arrangement mutatis mutandis, and vice versa, as being appreciated by a person skilled in the art.

The arrangement may be configured to contain or implement a number of functional modules to execute different method items, such as a data collector module for obtaining deterministic user data for modeling, a modeler for actually creating the model(s), a metering module for capturing (deterministic) usage statistics of apps for prediction purposes, and a predictor to estimate (predict) demographics based on the metered app usage data.

In addition, a content provision module may be provided to determine user preferences/interests, e.g. purchase intent, based on the estimate. Digital content in line with the preferences may be then provided to the user via user terminal, e.g. as in-app ad(vertisement). A data repository or repositories, e.g. a database, may be locally or externally maintained for data including user data such as deterministic (hard) data and/or modeled (estimated/predicted) data regarding a plurality of (terminal) users. A segmentation or audience determination module may be provided to find users fulfilling criteria provided e.g. by a marketer or some other third party system. The module may utilize e.g. lookalike modeling to find a greater audience than the initial one possibly more directly or explicitly suggested by the input criteria. The arrangement may further comprise a DMP, DSP, and/or SSP type platform, or at least a portion thereof.

The utility of the present invention arises from multiple issues depending on each particular embodiment thereof. Data may be gathered, preferably by means of user terminals, regarding the true usage of different applications by the users during a desired monitoring period. Different embodiments of the metering technology suggested herein actually enable collecting massive amounts of user data such as app usage data from user devices basically transparently, i.e. in the background requiring no user intervention from the device users.

Instead of merely concentrating on e.g. which applications are downloaded from an app store and installed at a terminal, the actual usage of the applications is tracked and applied in estimating user demographics and potential further variables such purchase intent, which may be considered to depend on the demographics and thus also on the usage data. As the estimate is based on a model that has been established using hard, deterministic data on users, their demographic characteristics (e.g. explicitly asked via optionally digital user survey) and used applications (preferably automatically metered), the accuracy of the estimates is good provided that the modeling data, i.e. training set with known deterministic application usage and demographic information has itself been sufficiently comprehensive and representative.

The estimated demographics and available additional data such as application usage data or further behavioral and/or contextual data may be utilized in various audience determination applications potentially involving e.g. lookalike modeling. Proper prospects for e.g. digital commerce such as product, including service, marketing with reference to offers and ads among other possibilities may be determined accordingly.

By a selected lookalike modeling technique utilizing an embodiment of the present invention the target audiences may be expanded from the initially defined ones. Indeed, new sector(s) of audience whose potential the marketer or generally content provider could not otherwise easily realize may be found. For example, a limited initial seed audience of customers or generally users may be enriched with added attributes such as demographic and/or behavioral characteristics obtained from various sources and/or through modeling. The enriched initial data may be then matched with the data of greater audience to find similarities.

User anonymity and generally privacy may be preserved during the process as anonymized IDs (hashes etc.) calculated from e.g. e-mail addresses or e.g. cookies may be utilized to distinguish between users instead of relying upon non-anonymous identity data. Likewise, app usage statistics and demographic data may be collected for modeling or prediction purposes anonymously.

One novel way to exploit various embodiments of the present invention is to enrich, either e.g. in connection with lookalike modeling or generally, already available data such as demographic data regarding the users by supplementing it with behavioral data preferably including app usage data that has been obtained by an embodiment of the present invention and further linked with (predicted) demographics. This approach may also turn out valuable to many parties such as DSP type platforms that may then target data, optionally ads, even more accurately or versatilely than before.

Reverting to the general applicability of various embodiments of the present invention, the suggested solution is flexibly scalable to cater for different computing platforms with distinct processing, memory and communications capacities. To reduce processing and memory footprints, in some embodiments a selected data dimensionality reduction method may be applied to the high-dimensional app usage data to reduce the number of descriptive variables (features) of the model through utilization of e.g. SVD (Singular Value Decomposition) or TSVD (truncated SVD) based components learned in an unsupervised manner as the variables.

Additional utilities of the embodiments of the present invention will become clear to a skilled reader based on the detailed description below.

The expression "a number of" may herein refer to any positive integer starting from one (1).

The expression "a plurality of" may refer to any positive integer starting from two (2), respectively.

The expression "app", i.e. "application", may refer herein to various apps such as native apps but also e.g. HTML5 (Hypertext Markup Language 5) apps, widgets, web sites, or some hybrid solutions in between.

The "use" of an app may refer herein to scenarios where a user triggers execution of or otherwise interacts with the app at or via a terminal so that it may be detected by the applied metering solution. Merely installing an app may, still depending on the embodiment, be omitted from the activities indicating "use" of the app from the standpoint of the present invention. Yet, in preferred embodiments, possible automated (non-user-initiated) execution of apps or e.g. automated update of once-installed apps is excluded from the use monitoring for inferring demographics as the focus is kept in applications that users willingly and knowingly utilize during a modeling or monitoring period. Having regard to apps that run e.g. most of the time in the background while the terminal is on, potentially without requiring any user action since their initial launch (which may, for its part, be automatic upon device start-up), e.g. user interaction with the app may be considered as the monitored type of "use". The interaction may include switching the app into the foreground (visible on display) and/or providing user input targeted thereto, for instance.

Different embodiments of the present invention are disclosed in the attached dependent claims.

BRIEF REVIEW OF THE DRAWINGS

Few embodiments of the present invention are described in more detail hereinafter with reference to the drawings, in which.

DETAILED DESCRIPTION

Figure 1:
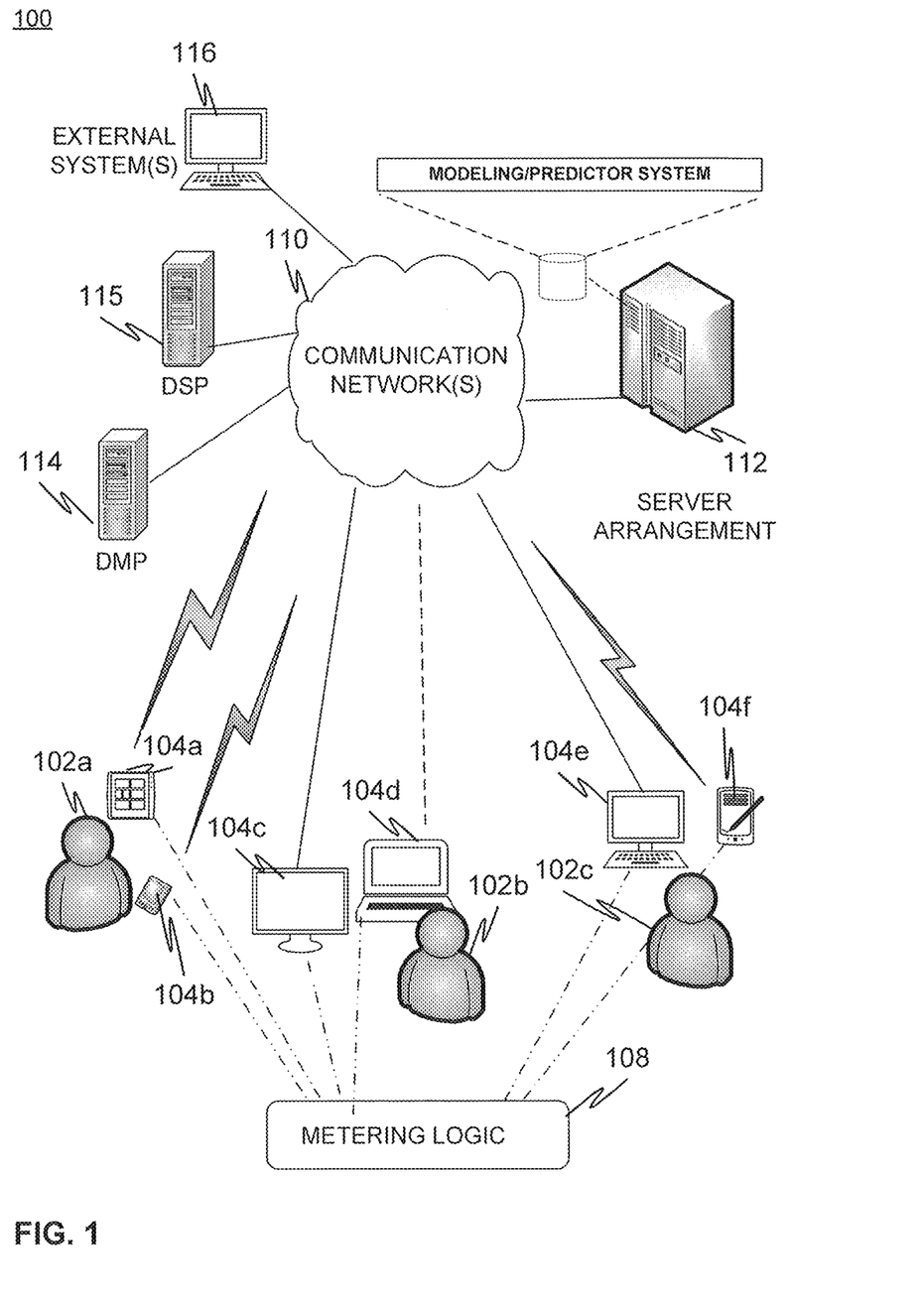
FIG. 1 illustrates one embodiment of an arrangement in accordance with the present invention in a potential use scenario.

FIG. 1 shows, at 100, one merely exemplary use scenario involving an embodiment of an arrangement 112 in accordance with the present invention and few instances 104a, 104b, 104c, 104d, 104e, 104f of user terminal devices applicable in connection with the present invention as well.

A network 110 may refer to one or more functionally connected communication networks such as the Internet, local area networks, wide area networks, computer networks, cellular networks, etc., which enable terminals 104a, 104b, 104c, 104d, 104e, 104f, possible external systems and elements 114, 115, 116 as well as the arrangement 112 to communicate with each other.

The server arrangement 112 may be implemented by one or more functionally connected electronic devices such as servers and potential supplementary gear such as a number of routers, switches, gateways, and/or other network equipment. In a minimum case, a single device such as a server may be capable of executing different embodiments of the method and may thus constitute the arrangement 112 as well. In other embodiments, a system of several devices such as servers may be used to build up the arrangement. At least part of the devices of the arrangement 112 may reside in a cloud computing environment and be dynamically allocable therefrom.

As mentioned above, the arrangement 112 may be configured to communicate, e.g. via the network(s) 110, with a number of external elements and systems 114, 115, 116, optionally including e.g. a DMP 114 or DSP 115. Yet, e.g. the arrangement 112 may be configured to communicate with e.g. web services/servers hosting e.g. online stores or various other online platforms 116 through which user data may be transferred for analysis optionally in anonymized form.

In some embodiments, the arrangement 112 may be configured to implement at least portion of (functionality) of the DMP 114 and/or DSP 115, or it may serve such entities 114, 115, 116 with desired data.

Indeed, the arrangement 112 may be configured to output predicted demographics and/or further stored, analyzed, derived and/or otherwise processed information. The information may include indications of user preferences or interests, target audience data, app usage data or selected digital content determined based on the user data.

The arrangement 112 may further maintain or have at least access to a user data repository such as at least one database comprising user data obtained from the terminals 104a, 104b, 104c, 104d, 104d, 104f and/or other external elements 114, 115, 116. The user data available therein may be subjected to modeling (demographics, lookalike, etc.) or prediction tasks, for example.

The terminals 104a, 104b, 104c, 104d, 104e, 104f may refer to mobile terminals 104a, 104b, 104f such as tablets, phablets, smartphones, or cell phones, laptop computers 104d or desktop computers 104c, 104e for instance, but are not limited thereto. Yet, different wearable electronic devices or specifically accessories such as smart (electronic) goggles or headsets may be included. The users 102a, 102b, 102c may carry mobile devices 104a, 104b, 104d, 104f along while heavier or bulkier devices 104c, 104e often remain rather static if are not basically fixedly installed. All these devices may support wired and/or wireless network communication. For example, wired Ethernet or generally LAN (local area network) interface may be provided in some devices 104c, 104e whereas the remaining devices 104a, 104b, 104d, 104f may dominantly support at least cellular or wireless LAN connections.

The terminals 104a, 104b, 104c, 104d, 104e, 104f may be provided with observation and communication, or 'metering', logic 108 e.g. in the form of a computer (processing device) executable software application that is downloaded via a network connection or embodied on a physical carrier medium such as a memory card or optical disc. The software may be optionally bundled with other software. The logic may be configured to log data on terminal, application, service usage, user engagement, communication, etc. and other events taking place therein. The data may be transmitted e.g. in batches to the arrangement 112 for processing, analysis and/or storage in the light of desired media measurements or e.g. prediction of user demographics. The transmissions may be timed, substantially immediately following the acquisition of the data, and/or be based on other selected triggers.

In modeling phase of the prediction procedure described herein, at least some of the terminals 104a, 104b, 104c, 104d, 104e, 104f may further be configured to provide explicit data on user demographics to the arrangement 112. Preferably the demographic data is deterministic, e.g. verified or input by the users themselves. Alternatively or additionally, for establishing the predictive model for user demographics, different methods of gathering the necessary deterministic modeling data (app usage and demographic characteristics) may be exploited including e.g. more traditional, potentially offline, surveys or panel studies with appropriate enrollment mechanisms.

In some embodiments, the obtained data may be subjected to at least limited analysis already at the terminals 104a, 104b, 104c, 104d, 104e, 104f. Preferably, indications of application usage are collected e.g. in logs and forwarded by the terminals 104a, 104b, 104c, 104d, 104e, 104f to the arrangement 112, for instance.

Preferably the metering logic acts in the background so that any user actions are not necessary for its execution. The logic may actually be substantially transparent to the user (by default not visually indicated to the user, for example). So-called passive metering may be thus implemented. A single user 102a may be associated with a plurality of user devices 104a, 104b that may provide data such as app usage data to the arrangement 112 either independently or via a master device selected from within the plurality. In the latter case, the master device or both devices may contain metering logic of their own.

Data from multiple devices or generally sources such as external elements 114, 115, 116 may be associated with the same user 102a, 102b, 102c by applying preferably anonymized ID data such as hashes (e.g. hashed user credential such as user name or e-mail address) or cookies for the purpose.

As alluded to hereinbefore, the arrangement 112 comprises or is at least functionally connected to a data repository, such as one or more databases accessible by the arrangement 112, configured to store data such as data regarding a plurality of users. The arrangement 112 may be configured to supplement the received or accessed user data e.g. with different predictions such as demographics or behavioral estimates derived therefrom.

For intelligent processing and analysis of the obtained data, the arrangement 112 may comprise a number of different functional modules that are considered in greater detail hereinafter.

Figure 2:
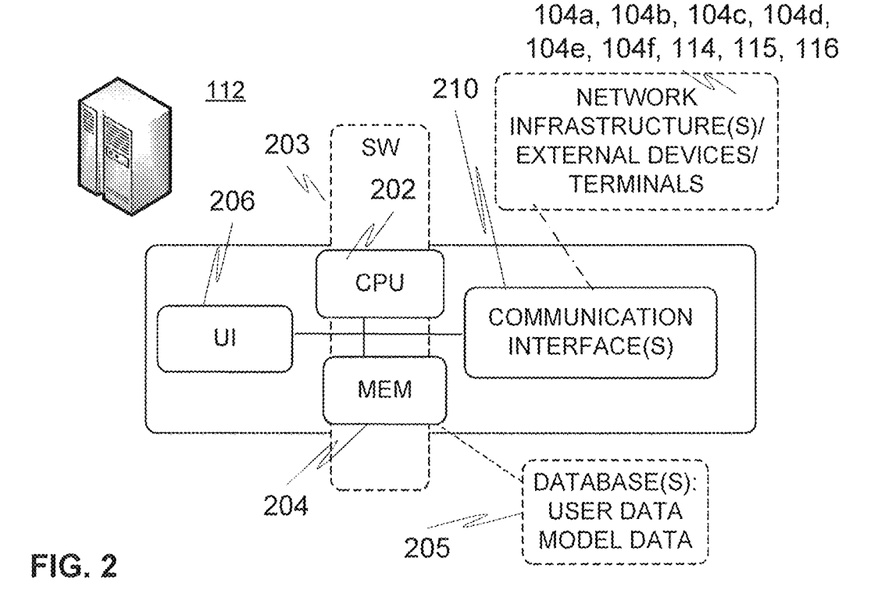
FIG. 2 depicts, via a block diagram, selected potential internals of the arrangement in accordance with an embodiment thereof, such as the one of FIG. 1.

First with reference to FIG. 2, however, the arrangement 112 may be physically established by at least one electronic device, such as a server computer (apparatus/device). The arrangement 112 may in some embodiments comprise a plurality of at least functionally connected devices such as servers and optional further elements, e.g. gateways, proxies, data repositories, firewalls, etc. Also a number of user devices (terminals) equipped with feasible metering logic for the provision of app usage statistics and/or other (behavioral (e.g. user engagement indicating), contextual and/or demographic) data may be operatively included in the arrangement 112. At least some of the included resources such as servers or computing/storage capacity—providing equipment in general may be dynamically allocable from a cloud computing platform, for instance.

At least one processor, or 'processing unit', 202 such as a microprocessor, microcontroller and/or a digital signal processor may be included. The processing unit 202 may be configured to execute instructions embodied in a form of computer software 203 stored in a memory 204, which may refer to one or more memory chips or generally memory units separate or integral with the processing unit 202 and/or other elements.

A person skilled in the art appreciates the fact that in shared or distributed computing type implementations with reference to various cloud computing options readily available, a number of processors 202 and other elements such as memory 204 and communication interface 210, may be separately included in each constituent device, such as a server, thus establishing in a functional sense a collective processor 202 or other element of a greater capacity, which element still physically comprises several, potentially distributed, sub-processors or other sub-elements. Alternatively or additionally, a number of operatively shared physical elements, with reference to e.g. network-accessible processing or memory units, may be used by several servers or other specific devices or instances of a multi-device arrangement.

The software 203 may define e.g. one or more applications, routines, algorithms, etc. for data processing such as modeling, prediction, audience determination possibly including lookalike modeling, user preferences such as purchase intent determination, and/or data aggregation. A computer program product comprising the appropriate software code means may be provided. It may be embodied in a non-transitory carrier medium such as a memory card, an optical disc or a USB (Universal Serial Bus) stick, for example. The program may also be transferred as a signal or combination of signals from a transmitting element to a receiving element with either a wired or wireless method.

One or more data (user data, model data, content data, etc.) repositories such as database(s) 205 of preferred structure and storing e.g. the obtained, completed, analyzed and/or processed data may be created in the memory 204 for utilization by the processing unit 202 or external elements. The repositories may physically incorporate e.g. RAM (random-access memory) memory, ROM (read-only memory), Flash memory, magnetic/hard disc, optical disc, memory card, etc.

A UI (user interface) 206 may provide the necessary control and access tools for controlling the arrangement such as definitions of modeling, prediction, processing, analysis, or other tasks. The UI 206 may include a number of components for local data input (e.g. keyboard, touchscreen, mouse, voice input) and output (display, audio output) and/or for remote input and output optionally via a web interface, preferably web browser interface. The system may thus host or be at least functionally connected to a web server, for instance.

The depicted communication interface(s) 210 refer to one or more data interfaces such as wired network (e.g. Ethernet) and/or wireless network (e.g. wireless LAN (WLAN) or cellular) interfaces for interfacing a number of external devices and systems with the arrangement of the present invention for data input/reception and output/transmission, i.e. data transfer, purposes, potentially including control. The arrangement 112 may be connected to the Internet for globally enabling easy and widespread communication therewith. It is straightforward to contemplate by a skilled person that when an embodiment of the arrangement 112 comprises a plurality of functionally connected devices, any such device may contain e.g. a communication interface 210 of its own for mutual and/or external communication.

The terminal devices 104a, 104b, 104c, 104d, 104e, 104f and/or external devices/systems 114, 115, 116 directly or indirectly connected to the arrangement 112 for providing data thereto or obtaining data such as various deliverables therefrom, may generally contain similar hardware elements such as a processor, a memory and a communication interface. Preferably, in particular the user devices 104a, 104b, 104c, 104d, 104e, 104f for providing app usage statistics may be equipped with metering logic for gathering user data such as data on media usage, preferably comprising app usage, of the panelist. The metering logic may be configured to log data on a number of potentially predefined events, occurrences, measurements and provide the log forward towards the arrangement either directly or via different host application systems when bundled with other software, for example.

Figure 3:
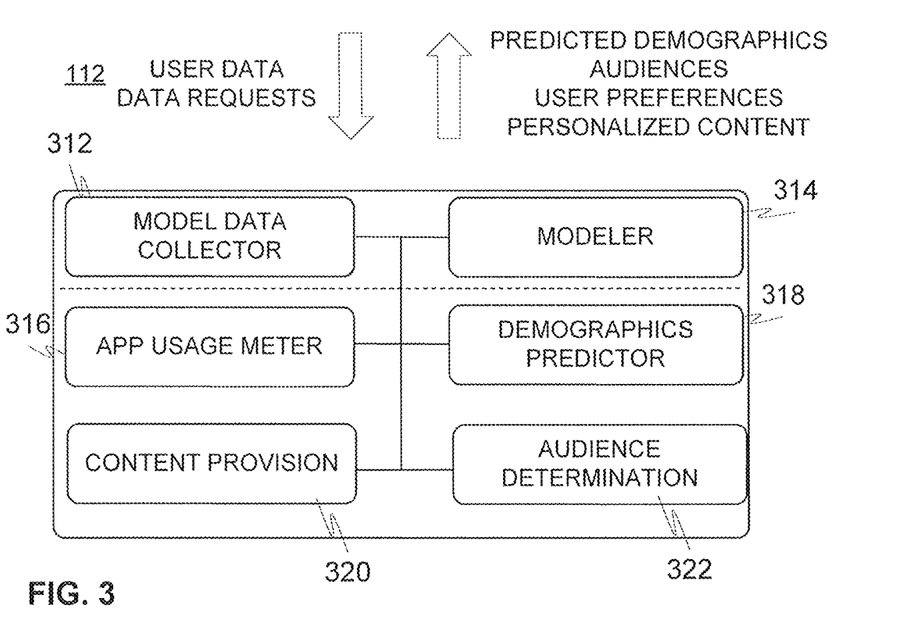
FIG. 3 shows another block diagram depicted from a functional standpoint in contrast to the more structural, hardware-oriented view of FIG. 2.

When primarily considered from a functional or conceptual standpoint, see FIG. 3, the arrangement 112 may be considered to comprise a number of at least operatively connected modules, which in this case refer to functional ensembles that could also be physically realized in a variety of other ways depending on the embodiments, e.g. either by larger ensembles covering a greater number of functionalities or by smaller ensembles concentrating on a fewer number of functionalities. The ensembles may contain program code or instructions 203 and other data stored in the memory 204. The actual execution may be performed by the at least one processing unit 202.

Model data collector 312 may be configured to receive (optionally by interrogation/pulling/survey mechanism) and manage (store, filter, combine, process, distribute) user data for modeling purposes. The data may contain hard, deterministic data having regard to a number of demographic characteristics (e.g. age, sex, marital status, race, income, language, country or other location information, occupation, and/or religion), application usage statistics and optional further, potentially behavioral data, which may be then utilized in creating a number of models associating e.g. app usage information (explanatory variables) with related predicted demographic characteristics (dependent variables) as explained herein. Further, a number of other characteristics such as behavioral characteristics may be included in the model as explanatory and/or dependent variables.

Data used for modeling may be obtained from preferably personal user terminals utilizing e.g. background type data gathering and metering tools, which enable practically establishing desired representative (in terms of target population) digital panels of terminal users as panelists. Additionally or alternatively, the data could be obtained by means of more traditional surveys and panels, which are digital and/or non-digital.

Modeler 314 may be configured to establish the aforesaid model(s) based on the data supplied by the collector 312.

The model(s) may include a logistic regression model or e.g. multinomial or ordinal logistic regression model. Actual model (parameter) estimation, or 'model fitting', may be executed based on a selected method such as least squares or max likelihood based method. In some embodiments, e.g. a multi-label prediction technique may be applied for predicting similar characteristics together or simultaneously, which may be based on an assumption that not all the demographic characteristics are independent.

According to one embodiment, there are categorical, optionally binary, dependent variable(s) in the model(s) constructed. There may in practice be a model for each demographic characteristic to be modeled as a dependent variable, for instance.

To enable implementation of a binary type of a solution, the demographic and potential other dependent variables may be first binarized when necessary. For example, an age-related variable may be established to cover two classes relating to ages between 18 and 32 years and ages between 33 and 100 years accordingly. Likewise, race variable could consist of white and non-white classes. The classes may be balanced, which facilitates comparing the predictability of different demographic variables, for example.

In some embodiments, e.g. support vector machines (SVM) and/or random forests could be applied for modeling and prediction purposes in addition to or instead of logistic regression.

In some embodiments of the models, such as in the case of the aforesaid logistic regression model, the explanatory variables may be implemented as binary or non-binary. Multiple explanatory, e.g. binary type, variables may be represented or handled e.g. as a feature vector wherein detected usage of an application during a modeling or monitoring (prediction) period then converts into one predefined value (e.g. '1') of the feature corresponding to that particular application whereas non-use of the application respectively translates into the other possible value (e.g. '0') in the case of binary variables.

In some embodiments, source data obtained for modeling may be first pre-processed possibly including, among other options, filtering. For example, applications with very low number of users (e.g. ten or less being used as a related threshold) may be removed from the final data set to preserve the privacy of the concerned users.

Nevertheless, the resulting feature vectors may be very sparse as each application reserves a single (binary) feature thereof if application-specific features are applied. Therefore, in some embodiments a selected dimensionality reduction technique may be taken into use.

In one rather straightforward embodiment only applications that are installed by some selected percentage or more generally share of inspected users are considered. This approach may in many use scenarios turn out less desirable, however, because some applications may be surprisingly or particularly reliable predictors of certain demographic characteristics even though they are relatively rarely installed, with reference to e.g. a period tracking app, which quite reliably predicts female gender. Such particularly pertinent predictors of one or more e.g. demographic characteristics may be indeed identified based on the training data. It may be ascertained by proper implementation and configuration of preferably client-based metering software that at least the usage data of such applications is duly tracked, naturally provided that the related demographics are of some interest or value in the first place considering the analysis task in question.

According to a further approach, the installed apps may be aggregated to category level based on a selected categorization system such as one utilized in a reference app/web store or some other network-based platform with reference to e.g. Google Play™.

In some preferred embodiments, singular value decomposition based solution such as Truncated Singular Value Decomposition (TSVD) is employed. In a variation thereof, instead of using the SVD components directly as features for predicting the demographics of app users, a recommender system approach could be adopted. (T)SVD has been generally found to provide accurate prediction results. Also dimensionality reduction techniques such as the aforementioned categorization may be utilized in connection with (T)SVD, but more preferably same number of SVD components are learned in an unsupervised manner. Nevertheless, absolute prediction accuracy may be, in most cases, best without any dimensionality reduction method implemented.

A variety of tests were conducted on a selected training set constructed from app usage statistics of about 4000 Android™ users during a period of one month, where the total number of applications used was about 8800. Few illustrations of achieved classification accuracy are plotted in FIG. 5, where item 502 refers to ROC (receiver operating characteristic) curve for gender detection (Male' treated as the positive class) and item 504 refers to the effect of a training set size on gender prediction.

Figure 5:
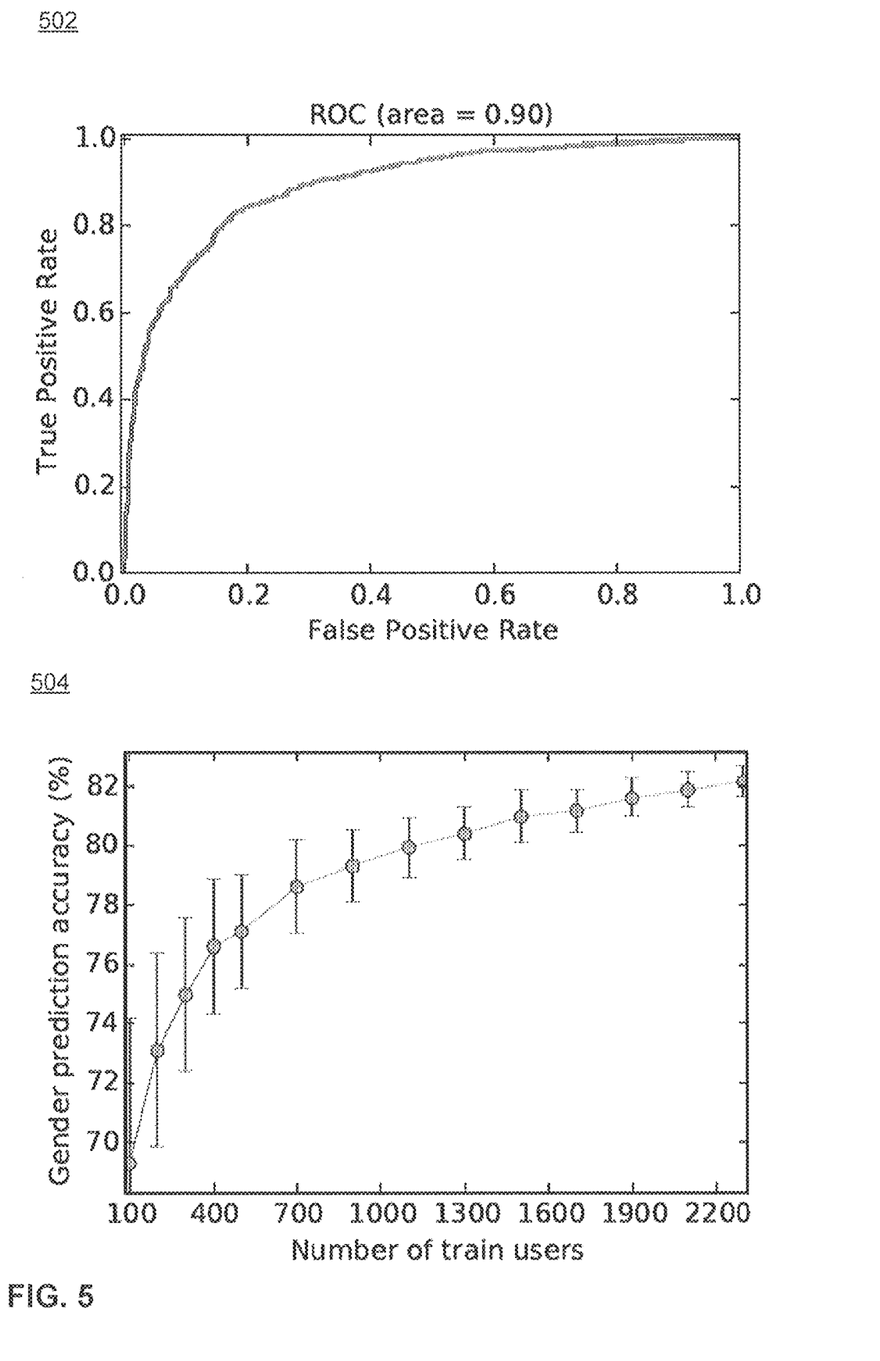
FIG. 5 visualizes different details of classification accuracy achieved during initial tests of a modeling and prediction method in accordance with an embodiment of the present invention.

From the ROC 502 one may easily notice that with a proper decision threshold rather high true positive rate (sensitivity) may be achieved as the curves approaches the upper left corner while false positive rate (1-specificity) remains low. Anyway, in some applications, with reference to e.g. various DSP related use cases, true positives may be valued higher (i.e. much more valuable) than the risk of false positives, whereupon also the threshold may be optimized accordingly.

Generally, correlation between certain apps and a number of demographic characteristics was found to be strong. For example, the use of certain sports related apps or game apps was found to correlate well with male gender within an inspected age group whereas the presence of the aforesaid period tracking applications and some web stores in the list of used apps strongly implied a female user instead. Yet, e.g. the use of dating apps correlated well with a 'single' type marital status of a user. Further, high-income users were more likely to utilize business networking applications like LinkedIn™ in contrast to lower-income users more interested in job seeking apps such as Job Search™.

With reference to curve 504, training set size correlates positively and quite drastically with a prediction capability of the resulting model. An absolute improvement of more than ten percent was be obtained by increasing the training set size from 100 users to 2 300 users, for example. The depicted error bars show the standard deviations of the accuracies over 100 balanced random subsamples per given number of train users.

Predictability of demographic characteristics of a user in the light of the total number of applications used by him/her during a tracked period such as one month was further briefly evaluated. It was found that in many cases a (detected) use of about 50-150, e.g. about 100, apps during the period yields good if not best prediction accuracy.

Reverting to FIG. 3, app usage meter 316 may be provided and configured to acquire and optionally pre-process such as filter or aggregate (categorize, for instance) app usage data of target user(s) during a monitoring period, optionally of equal duration with the modeling period, such as one week or month. As the collection and processing mechanism (metering) of app usage data may be similar in both the modeling and prediction tasks, the collector 312 and metering 316 modules may be in some embodiments integrated, or the metering module 316 may be configured to establish e.g. a sub-module of the collector 312 while additionally serving a predictor 318 as well.

Nevertheless, as generally contemplated herein the app usage data used for predicting or creating the related predictive model may be acquired through preferably passive type metering software running in user terminals and configured for capturing and distributing app usage statistics and optional other behavioral and/or contextual data, such as indications of user engagement. For example, indications of user engagement with the device, device UI, some application or other feature of the device, certain content or generally media, etc. may be measured. With passivity, it is again referred to software running substantially transparently in the background at least for most of the time and not requiring at least active user intervention or control for its operation. A metering client may e.g. periodically transmit the gathered user statistics to the server side module of the metering solution 316, or it may be interrogated for such data by the server instead.

The metering software may be particularly configured to monitor different APIs (application programming interface) and e.g. instances of identifiable content or app-specific fingerprints (e.g. graphical on-display fingerprints such as logos, symbols, graphical objects, views, etc., signaling/communication/network traffic fingerprints and/or audio fingerprints) for gathering the statistics. E.g. screen capturing technology may be applied in data acquisition.

The predictor 318 is configured to translate input app usage (and/or other) statistics as provided by the meter 316 or specified e.g. in a received data request into a number of predicted demographic and/or other, e.g. behavioral, characteristics via one or more models previously created for the purpose at 314. As discussed above, the statistics may include e.g. app-level feature vectors or e.g. higher level abstractions such as categorized aggregated versions thereof.

Content or generally data provision module 320 may be configured to serve e.g. different data or specifically content requests, which may also be other than demographic data requests, potentially including but not limited to user preferences or purchase intent queries.

The received requests may include e.g. (anonymized) ID, demographic, behavioral such as app usage or other definitions or identification factors of target user(s) whose interests or preferences should be then determined based on e.g. stored and/or estimated data such as purchase behavior or other behavioral data associated with the identified or similar users as considered according to a selected similarity criterion. Digital content items such as media items (e.g. digital entertainment such as games, videos, movies, pictures or music, utilities, other apps, ads, etc.) in line with the determination results may be identified and transmitted, or at least indicated, as a response.

Audience determination module 322, which may be alternatively integrated e.g. with the content provision module 320, may in turn be configured to determine a target audience of users from the available user data. The search may be executed in response to input definitions, or 'seed' data, of desired prototype user(s) characterized in an audience request received.

As described hereinbefore, the target audience may be searched from the internal or external user records associated with e.g. different web sites, web/app stores, and/or other platforms discussed hereinbefore or generally.

First of all, the users directly matching the seed input (exemplary user(s) or user profile(s) defined in the data request received) may be determined based on the accessible user records. An indication of matching users (e.g. users ID's such as anonymized ID's optionally comprising hashed originally non-anonymous ID's like e-mails, or still non-anonymous ID's optionally comprising e-mail addresses or user names) may be provided as a response.

Additionally or alternatively, lookalike modeling may be applied to find similarities between the seed group definition and a greater group of users.

Various predicted (estimated, i.e. not measured as such) characteristics, which may be e.g. demographic and/or behavioral such as app usage or purchase based, or e.g. user preference/interest based, may be utilized both in finding direct matches or a greater target audience from the available user data. The greater audience may be established using e.g. lookalike modeling wherein any or all characteristics initially used for defining the original seed group of users may not have to be carried by new members, because the required level of similarity may be found from other common characteristics, either modeled (estimated/predicted) or metered (measured/deterministic) ones.

Having regard to different possible embodiments of the modules of FIG. 3, a person skilled in the art will appreciate the fact that the above modules and associated functionalities may be realized in a number of ways. A module may be divided into functionally smaller units or two or more modules may be integrated together to establish a larger functional entity. In case the arrangement 112 comprises several at least functionally connected devices, the modules may be executed by dedicated one or more devices or the execution may be shared, even with dynamic allocation, among multiple devices e.g. in a cloud computing environment.

A dotted horizontal line represents a possible split of modeling phase activities and prediction phase activities between different arrangements or devices, i.e. an arrangement applying the model for prediction purposes has not necessarily constructed the model by itself but received it from other, model-creating arrangement instead. A skilled reader will naturally realize that all arrangements applying the model do not even have to include a metering solution 316 of their own as the app usage statistics used as input to the prediction process 318 may be obtained from external sources, optionally included in a data request for demographic estimate, instead.

Figure 4:
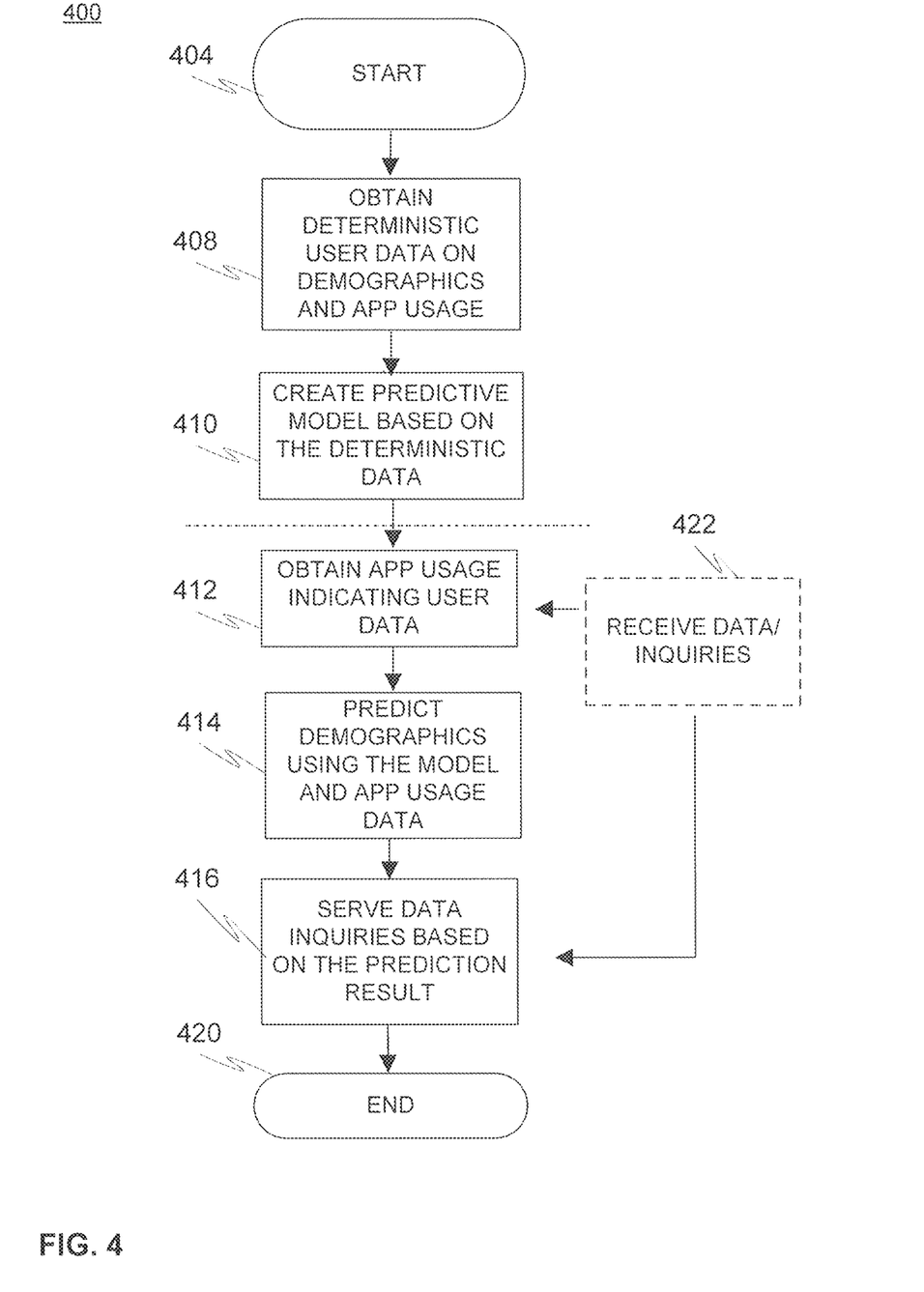
FIG. 4 is a flow diagram disclosing an embodiment of a method in accordance with the present invention.

FIG. 4 is a flow diagram 400 disclosing an embodiment of a method in accordance with the present invention. Although the shown diagram contains a plurality of definite method items, in various other embodiments all the same items do not have to present. There may be additional method items as well that are not shown in the figure.

At method start-up 404, different preparatory tasks may be executed. For example, a number of servers constituting at least part of an embodiment of an arrangement in accordance with the present invention may be provided with necessary control and analysis software and ramped up. Metering (client) software, optionally bundling with various host applications, may be installed at a number of user devices such as mobile terminals. Communication connections and links between data sources, targets, etc. may be established and tested.

At 408, user data for creating a number of predictive models is obtained. The data may be provided from e.g. personal user devices such as mobile terminals through metering software running thereat as discussed above. The user data preferably comprises or consists of deterministic (measured and/or verified, such as user-confirmed) app usage data and deterministic (e.g. user input) demographic data so that the predictive model(s), preferably linear regression model(s), may be created and related parameters such as decision thresholds selected based on substantially valid and true, not merely guesstimated and probable, information.

At 410, the obtained data is then utilized for establishing the predictive model(s) by applying selected parameter estimation technique(s) to the training data collected at 408.

The modeling data may be processed at this point or earlier in connection with item 408 to better suit the selected model(s). For example, a selected dimensionality reduction technique may be executed. Data validity may be checked and/or filtering of redundant or unnecessary data performed in accordance with selected criteria as contemplated hereinabove.

A broken horizontal line has been depicted in the figure to separate modeling and prediction phases from each other, but a person skilled in the art readily understands that the division may not have to be equally literal in some other embodiments where the already-established model(s) may be updated alongside their actual use based on additional training data received. On the other hand, in some embodiments of the method, only the selected modeling phases or only the selected prediction phases may be executed by single embodiment of the arrangement in accordance with the present invention as was discussed in connection with the description of FIG. 3. The modeling and prediction procedures may indeed be split between two or more embodiments.

At 412, app usage data is received. As discussed hereinbefore the included app usage statistics may be provided by metering software running at a user terminal, for example. Alternatively, such data may be received in connection with related analysis request or other inquiry 422 acquired via a local UI or a communication interface from external system(s). In some embodiments, the inquiry 422 may be internally and automatically created based on e.g. a preprogrammed data processing or distribution schedule of deliverables.

At 414, the received data is optionally pre-processed and then input to the model(s) for obtaining the desired estimates of dependent variables such as a number of demographic characteristics. The estimated variables may be then associated with other data regarding the concerned user(s) to supplement the associated user models or profiles.

At 416, a data inquiry 422, such as the aforesaid request for demographic characteristics based on a user's app usage data log, and/or a request for audience determination based on an initial definition of audience (seed definition), user preference/interest request, or e.g. a user purchase intent request is then served by responding the inquirer with corresponding, pertinent analysis and/or measurement results preferably obtained through utilization of the constructed model(s).

Thus depending on the embodiment and e.g. nature of the inquiry 422 received, a valid response to the inquiry 422 may be constructed based on a number of modeled (predicted) and/or other available (e.g. explicitly metered/tracked) user characteristics.

Data processing tasks required for serving the inquiry 422 may take place responsive to the receipt of the inquiry 422, and/or a number of associated applicable processing tasks may have been already executed upfront to reduce the processing load and latency upon receiving the request. For example, in case the inquiry 422 defines a number of desired demographic characteristics for determining a larger audience by means of lookalike modeling, ready-estimated demographic characteristics of users whose app usage data has been available earlier may be then exploited among their other data to respond the inquiry with reduced latency instead of first starting with the estimation of demographic parameters regarding the concerned users.

Different user data needed for serving the requests may be stored by the arrangement executing the method and/or by a number of external systems, e.g. DMPs, DSPs, and/or SSPs, providing the arrangement with at least access to such data.

Various deliverables established by an arrangement executing the method to duly serve the data requests may generally be in a number of predefined proprietary or more commonly used digital formats enabling a recipient to adjust its functions or operations including service or content personalization, app development and related features, marketing campaign, and e.g. (technical) system optimization (bandwidth, etc.) optionally automatically based thereon according to a selected logic.

For example, a selected digital data structure, such as a message, a data table, a report or other form of deliverable(s), indicative of e.g. the predicted user demographics, user preferences/interests, purchase intent, or an indication of a larger user group determined based on seed audience definition (which initial definition may include certain target characteristics, such as demographic characteristics, app usage characteristics, purchase intent, and/or interest/preferences definitions) may be established and transmitted or otherwise published to the inquirer in response to the associated data request.

At least selected content of the deliverable may be represented in a human perceivable format using e.g. text or graphics via the UI of the arrangement itself (e.g. a display) or of a connected system/device.

A number of users such as the requested (larger) audience may be indicated e.g. via user ID's, which may be anonymous, to the inquirer.

At 420, the method execution is ended.

In various embodiments the nature of many shown method items, when executed in real-life and potentially also substantially real-time, scenarios may be repetitive, i.e. a number of models may be repeatedly updated, new ones calculated and various data inquiries served dynamically upon need by the executing arrangement.

The scope is defined by the attached independent claims with appropriate national extensions thereof having regard to the applicability of the doctrine of equivalents.

What is claimed is:

1. An electronic arrangement for predicting user demographics, comprising:
   a data interface for transferring data with external elements,
   at least one processor for processing instructions and other data, and
   memory tor storing the instructions and other data,
   said at least one processor being configured, in accordance with the stored instructions, to cause the electronic arrangement to:
      obtain deterministic user data having regard to a plurality of terminal users and a modeling period, wherein user data associated with each particular user of said plurality of terminal users indicates a number of demographic characteristics of that particular user as well as usage statistics indicative of digital applications said particular user has utilized during the modeling period,
      utilize a selected modeling scheme to establish at least one predictive user model, based on the obtained deterministic user data of the plurality of terminal users, including one or more of the number of demographic characteristics as dependent variables to be predicted and the usage statistics of applications as explanatory variables,
      obtain deterministic usage statistics indicative of digital applications a target user has utilized during a monitoring period, and
      determine, through utilization of the deterministic usage statistics obtained during the monitoring period as input to the at least one established predictive user model, an estimate of said one or more of the demographic characteristics of the target user, wherein the at least one established predictive user model uses dimensionality reduction including TSVD (Truncated Singular Value Decomposition), wherein the at least one established predictive user model uses a regression model applying multi-label prediction to predict a plurality of non-independent demographic characteristics simultaneously and a modeling data having a range of at least 100 users in a training set and wherein the electronic arrangement comprises determining a number of most predictive applications for a demographic characteristic by identifying a correlation strength between the demographic characteristic and application usage based on the obtained deterministic user data and removal of applications with a number of users from a data set being ten or less; and
   wherein the electronic arrangement comprises at least one passive metering client for installation at a user terminal, said at least one passive metering client being configured to collect, in the background, the usage statistics having regard to the digital applications during the modeling and/or monitoring period.

2. The arrangement of claim 1, configured to determine preferences or interests of the target user based on an estimate to supply a terminal of the target user with digital content, optionally advertisement, application or personalized application, in line with the preferences or interests.

3. The arrangement of claim 1, wherein the usage statistics incorporate application-level statistics indicative of usage of individual applications.

4. The arrangement of claim 1, configured to apply a selected dimensionality reduction technique to application-level usage statistics data, whereupon related explanatory variables are rendered categorical, each covering an application category.

5. The arrangement of claim 1, wherein the at least one predictive user model comprises a logistic regression model, with a categorical dependent variable associated with a selected demographic characteristic and a plurality of optionally binary type explanatory variables, each being associated with a particular application or a higher level generalization such as application category covering a plurality of applications.

6. The arrangement of claim 1, wherein indicated usage of an application included in the usage statistics covering the modeling or monitoring period is based on a detected user-triggered execution of the application or a detected user interaction or other engagement with the application during the modeling or monitoring period, respectively, while omitting mere installation of the application as an indication of application usage in the usage statistics.

7. The arrangement of claim 1, wherein the number of demographic characteristics indicate at least one element selected from the group consisting of: gender, age, marital or relationship status, race, income, language, country, occupation, and religion.

8. The arrangement of claim 1, comprising at least one element selected from the group consisting of: a data management platform (DMP), supply side platform (SSP) and a demand-side platform (DSP).

9. The arrangement of claim 1, provided with at least access to user data regarding a greater group of users, including demographic, interest and/or behavioral data, said greater group of users including said target user, and configured to:
   receive a data request indicative of target criteria for users, in terms of desired demographic, interest and/or behavioral characteristics thereof, and
   determine a sub-group of users from said greater group of users based on searching and finding users therefrom whose user data fulfills said target criteria according to a selected matching procedure.

10. The arrangement of claim 1, provided with at least access to user data regarding a greater group of users, including demographic, interest and/or behavioral data, said greater group including said target user, and configured to:
   receive a data request indicative of target criteria for users, in terms of desired demographic, interest and/or behavioral characteristics thereof, and
   determine a sub-group of users from said greater group of users based on searching and finding users therefrom whose user data fulfills said target criteria according to a selected matching procedure, wherein the electronic arrangement is configured to execute a selected lookalike modeling procedure based on the target criteria and the user data regarding the greater group of users to increase a size of said sub-group of users determined as a match from said greater group of users.

11. A method for predicting user demographics to be performed by at least one electronic apparatus, optionally a number of functionally connected servers, comprising:
obtaining deterministic user data having regard to a plurality of users and a modeling period, wherein user data associated with each particular user of said plurality of users indicates a number of demographic characteristics of the particular user as well as usage statistics indicative of digital applications the particular user has utilized during the modeling period,
establishing, through utilization of a selected modeling scheme, at least one predictive user model, based on the obtained deterministic user data of the plurality of users, including one or more of the number of demographic characteristics as dependent variables to be predicted and the usage statistics of applications as explanatory variables,
obtaining deterministic usage statistics indicative of applications a target user has utilized during a monitoring period, wherein at least one passive metering client installed at a user terminal collects, in the background, the usage statistics having regard to the digital applications during the modeling and/or monitoring period, and
providing, through utilization of the deterministic usage statistics regarding the monitoring period as input to the at least one established predictive user model, an estimate of said one or more of the number of demographic characteristics of the target user, wherein the at least one established predictive user model uses dimensionality reduction including TSVD (Truncated Singular Value Decomposition), wherein the at least one established predictive user model uses a regression model applying multi-label prediction to predict a plurality of non-independent demographic characteristics simultaneously and a modeling data having a range of at least 100 users in a training set and wherein the at least one electronic apparatus comprises determining a number of most predictive applications for a demographic characteristic by identifying a correlation strength between the demographic characteristic and application usage based on the obtained deterministic user data and removal of applications with a number of users from a data set being ten or less.

12. The method of claim 11, further comprising determining preferences or interests of the target user based on the estimate and supplying a terminal of the target user with digital content, optionally advertisement, media file, application or personalized application feature, in line with the preferences or interests.

13. The method of claim 11, comprising,
obtaining at least access to user data regarding a greater group of users, including demographic, interest and/or behavioral data, said greater group of users further including said target user,
receiving a data request indicative of a number of target criteria for users, and
determining a sub-group of users from said greater group of users based on searching and finding users therefrom whose user data fulfills said number of target criteria.

14. The method of claim 11, comprising:
obtaining at least access to user data regarding a greater group of users, including demographic, interest and/or behavioral data, said greater group of users further including said target user,
receiving a data request indicative of a number of target criteria for users, and
determining a sub-group of users from said greater group of users based on searching and finding users therefrom whose user data fulfills said number of target criteria, wherein a selected lookalike modeling procedure is executed based on the number of target criteria and the user data regarding the greater group of users in order to increase a size of said sub-group of users determined from said greater group of users.

15. A computer program product embodied in a computer readable non-transitory carrier medium, comprising computer-executable code to cause:
obtaining deterministic user data having regard to a plurality of users and a modeling period, wherein user data associated with each particular user of said plurality of users indicates a number of demographic characteristics of the particular user as well as usage statistics indicative of digital applications the particular user has utilized during the modeling period,
establishing, through utilization of a selected modeling scheme, at least one predictive user model including one or more of the demographic characteristics as dependent variables to be predicted and the usage statistics of applications as explanatory variables,
obtaining deterministic usage statistics indicative of applications a target user has utilized during a monitoring period, wherein at least one passive metering client for installation at a user terminal is configured to collect, in the background, the usage statistics having regard to the digital applications during the modeling and/or monitoring period, and
providing, through utilization of the deterministic usage statistics regarding the monitoring period as input to the at least one established predictive user model, an estimate of said one or more of the demographic characteristics of the target user, wherein the at least one established predictive user model uses dimensionality reduction including TSVD (Truncated Singular Value Decomposition), wherein the at least one established predictive user model uses a regression model applying multi-label prediction to predict a plurality of non-independent demographic characteristics simultaneously and a modeling data having a range of at least 100 users in a training set and wherein the non-transitory computer program product comprises determining a number of most predictive applications fora demographic characteristic by identifying a correlation strength between the demographic characteristic and application usage based on the obtained deterministic user data.

16. An electronic arrangement comprising:
a data interface for transferring data with external elements,
at least one processor for processing instructions and other data, and
memory for storing the instructions and other data,
said at least one processor being configured, in accordance with the stored instructions, to cause the electronic arrangement to:
obtain deterministic user data having regard to a plurality of terminal users and a modeling period, wherein user data associated with each particular user of said plurality of terminal users indicates a number of demographic characteristics of that particular user as well as usage statistics indicative of digital applications said particular user has utilized during the modeling period, utilize a selected modeling scheme to establish at least one predictive user model, based on the deterministic user data of the plurality of terminal users, including one or more demographic characteristics as dependent variables to be predicted and usage statistics of applications as explanatory variables, obtain deterministic usage statistics indicative of digital applications a target user has utilized during a monitoring period, wherein at least one passive metering client installed at a user terminal collects, in the background, the usage statistics having regard to the digital applications during the modeling and/or monitoring period, and determine, through utilization of the deterministic usage statistics obtained during the monitoring period as input to the at least one established predictive model, an estimate of one or more of the dependent variables, demographic characteristics of the target user, wherein the at least one established predictive user model uses dimensionality reduction including TSVD (Truncated Singular Value Decomposition), wherein the at least one established predictive user model uses a regression model applying multi-label prediction to predict a plurality of non-independent demographic characteristics simultaneously and a modeling data having a range of at least 100 users in a training set and wherein the electronic arrangement comprises determining a number of most predictive applications for a demographic characteristic by identifying a correlation strength between the demographic characteristic and application usage and removal of applications with a number of users from a data set being ten or less.

17. An electronic arrangement comprising a data interface for transferring data with external elements, at least one processor for processing instructions and other data, and memory for storing the instructions and other data, said at least one processor being configured, in accordance with the stored instructions, to cause the electronic arrangement to:

obtain deterministic user data having regard to a plurality of terminal users and a modeling period, wherein user data associated with each particular user of said plurality of terminal users indicates a number of demographic characteristics of that particular user as well as usage statistics indicative of digital applications said particular user has utilized during the modeling period, utilize a selected modeling scheme to establish at least one predictive user model, based on the obtained deterministic user data of the plurality of terminal users, including one or more demographic characteristics as dependent variables to be predicted and usage statistics of applications as explanatory variables, obtain deterministic usage statistics indicative of digital applications a target user has utilized during a monitoring period, and determine, through utilization of the deterministic usage statistics obtained during the monitoring period as input to the at least one established predictive user model, an estimate of one or more of the dependent variables, demographic characteristics of the target user, wherein the at least one established predictive user model uses a regression model applying multi-label prediction to predict a plurality of non-independent demographic characteristics simultaneously and a modeling data having a range of at least 2300 users in a training set, wherein the at least one established predictive user model comprises a plurality of explanatory variables, each of which representing usage statistics of a dedicated application and wherein the electronic arrangement comprises determining a number of most predictive applications for a demographic characteristic by identifying a correlation strength between the demographic characteristic and application usage based on the obtained deterministic user data and removal of applications with a number of users from a data set being ten or less; and wherein the electronic arrangement comprises at least one passive metering client for installation at a user terminal, said at least one passive metering client being configured to collect, in the background, the usage statistics having regard to the digital applications during the modeling and/or monitoring period.

\* \* \* \* \*